(12) United States Patent
Eck et al.

(10) Patent No.: US 12,670,775 B2
(45) Date of Patent: Jun. 30, 2026

(54) LEAKAGE CURRENT NOISE REDUCTION FOR IONIZATION CHAMBER BASED ALARMS

(71) Applicant: Microchip Technology Incorporated, Chandler, AZ (US)

(72) Inventors: Arthur Eck, Gilbert, AZ (US); Patrick McFarland, Gilbert, AZ (US); Jonathan Corbett, Havertown, PA (US)

(73) Assignee: Microchip Technology Incorporated, Chandler, AZ (US)

( * ) Notice: Subject to any disclaimer, the term of this patent is extended or adjusted under 35 U.S.C. 154(b) by 47 days.

(21) Appl. No.: 18/386,454

(22) Filed: Nov. 2, 2023

(65) Prior Publication Data

US 2024/0304078 A1 Sep. 12, 2024

Related U.S. Application Data

(60) Provisional application No. 63/451,127, filed on Mar. 9, 2023.

(51) Int. Cl.
| | |
|---|---|
| *G08B 17/11* | (2006.01) |
| *G08B 29/04* | (2006.01) |
| *G01N 15/00* | (2006.01) |
| *G01N 15/06* | (2006.01) |

(52) U.S. Cl.
CPC ............ *G08B 17/11* (2013.01); *G08B 29/043* (2013.01); *G01N 2015/0046* (2013.01); *G01N 15/0656* (2013.01)

(58) Field of Classification Search
CPC ...... G08B 17/10; G08B 17/11; G08B 17/113;

G08B 21/12; G08B 17/125; G08B 29/043; G08B 29/181; G08B 29/24; G01N 1/2208; G01N 15/0255; G01N 27/66; G01T 1/02; H01J 49/00
See application file for complete search history.

(56) References Cited

U.S. PATENT DOCUMENTS

| | | | | |
|---|---|---|---|---|
| 4,288,694 A | 9/1981 | Ahrons | ......................... | 250/374 |
| 2001/0038338 A1* | 11/2001 | Kadwell | .............. | G08B 29/043 |
| | | | | 340/630 |
| 2006/0071163 A1* | 4/2006 | Gorbunov | ............. | H01J 49/025 |
| | | | | 250/288 |
| 2013/0154659 A1* | 6/2013 | Cooke | .................... | G01N 27/66 |
| | | | | 324/469 |
| 2013/0154670 A1 | 6/2013 | Cooke et al. | ................. | 324/672 |

(Continued)

OTHER PUBLICATIONS

International Search Report and Written Opinion, Application No. PCT/US2024/019380, 13 pages.

*Primary Examiner* — Van T Trieu
(74) *Attorney, Agent, or Firm* — SLAYDEN GRUBERT BEARD PLLC

(57) ABSTRACT

As an example, an apparatus may include: an ionization chamber, a voltage source to drive the ionization chamber; a voltage sensor to measure an ionization chamber output voltage; a calibration circuit to compensate the ionization chamber output voltage based on a correction factor; and a monitoring circuit to trigger an alarm if the compensated output voltage meets a predetermined condition. The calibration circuit may determine the correction factor to compensate for any leakage current affecting the ionization chamber output voltage.

25 Claims, 12 Drawing Sheets

(56)                    References Cited

U.S. PATENT DOCUMENTS

2014/0084177  A1*   3/2014  Shintani ................... G01T 1/14
                                                        250/374
2023/0209699  A1*   6/2023  Verheijen .............. G03G 15/80

* cited by examiner

CONTROL SENSE
300

Sc G Si

GROUND/Vdd Sc
G TO Si DV ~Vos
G TO Sc DV ~Vdd/2

| LABEL | FUNCTION |
|-------|----------------|
| G | GUARD |
| Si | ION SENSE |
| Sc | CONTROL SENSE |

BIAS THE GUARD
400

GROUND/Vdd Sc
G TO Si DV ~Vos
G TO Sc DV ~Vdd/2

G   Si

| LABEL | FUNCTION |
|-------|----------|
| G | GUARD |
| Si | ION SENSE |

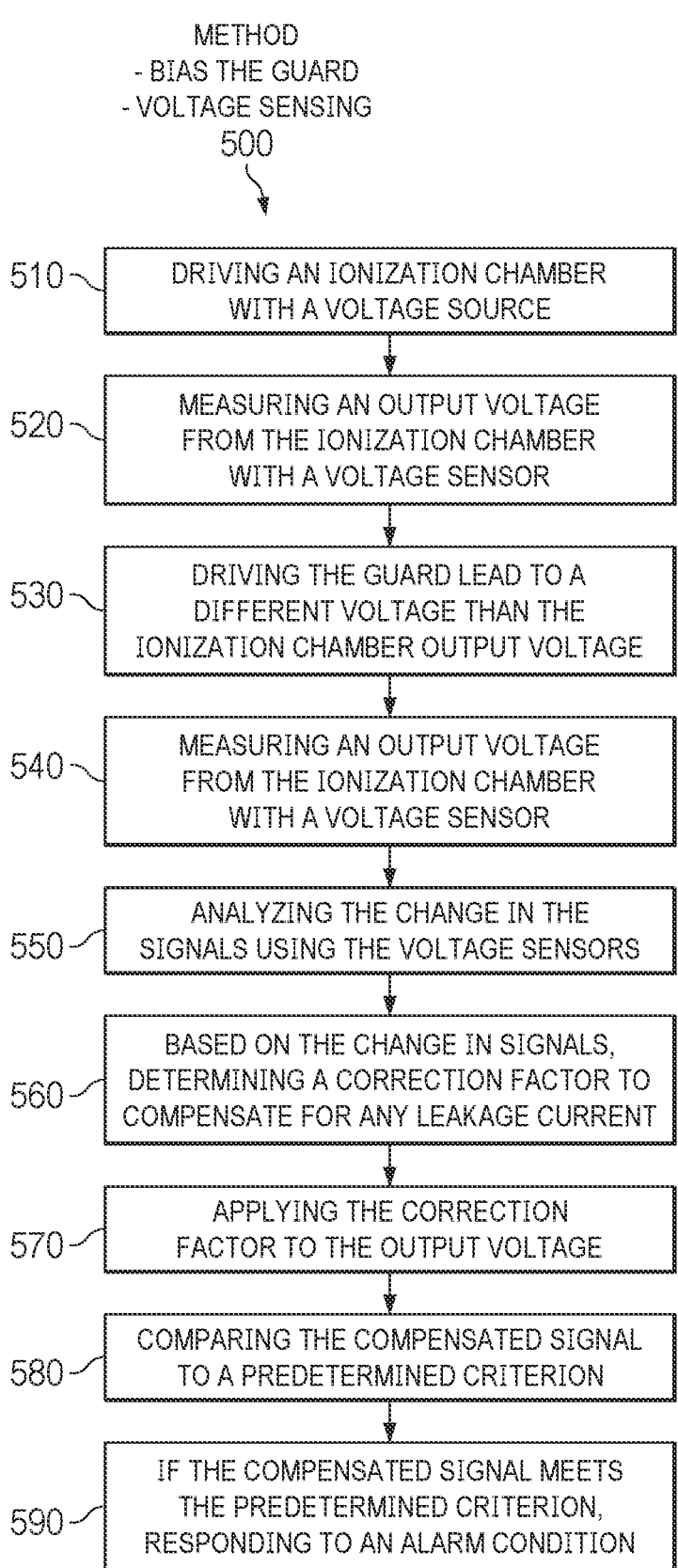

METHOD
- BIAS THE GUARD
- VOLTAGE SENSING
500

510 — DRIVING AN IONIZATION CHAMBER
WITH A VOLTAGE SOURCE

520 — MEASURING AN OUTPUT VOLTAGE
FROM THE IONIZATION CHAMBER
WITH A VOLTAGE SENSOR

530 — DRIVING THE GUARD LEAD TO A
DIFFERENT VOLTAGE THAN THE
IONIZATION CHAMBER OUTPUT VOLTAGE

540 — MEASURING AN OUTPUT VOLTAGE
FROM THE IONIZATION CHAMBER
WITH A VOLTAGE SENSOR

550 — ANALYZING THE CHANGE IN THE
SIGNALS USING THE VOLTAGE SENSORS

560 — BASED ON THE CHANGE IN SIGNALS,
DETERMINING A CORRECTION FACTOR TO
COMPENSATE FOR ANY LEAKAGE CURRENT

570 — APPLYING THE CORRECTION
FACTOR TO THE OUTPUT VOLTAGE

580 — COMPARING THE COMPENSATED SIGNAL
TO A PREDETERMINED CRITERION

590 — IF THE COMPENSATED SIGNAL MEETS
THE PREDETERMINED CRITERION,
RESPONDING TO AN ALARM CONDITION

FIG. 5A

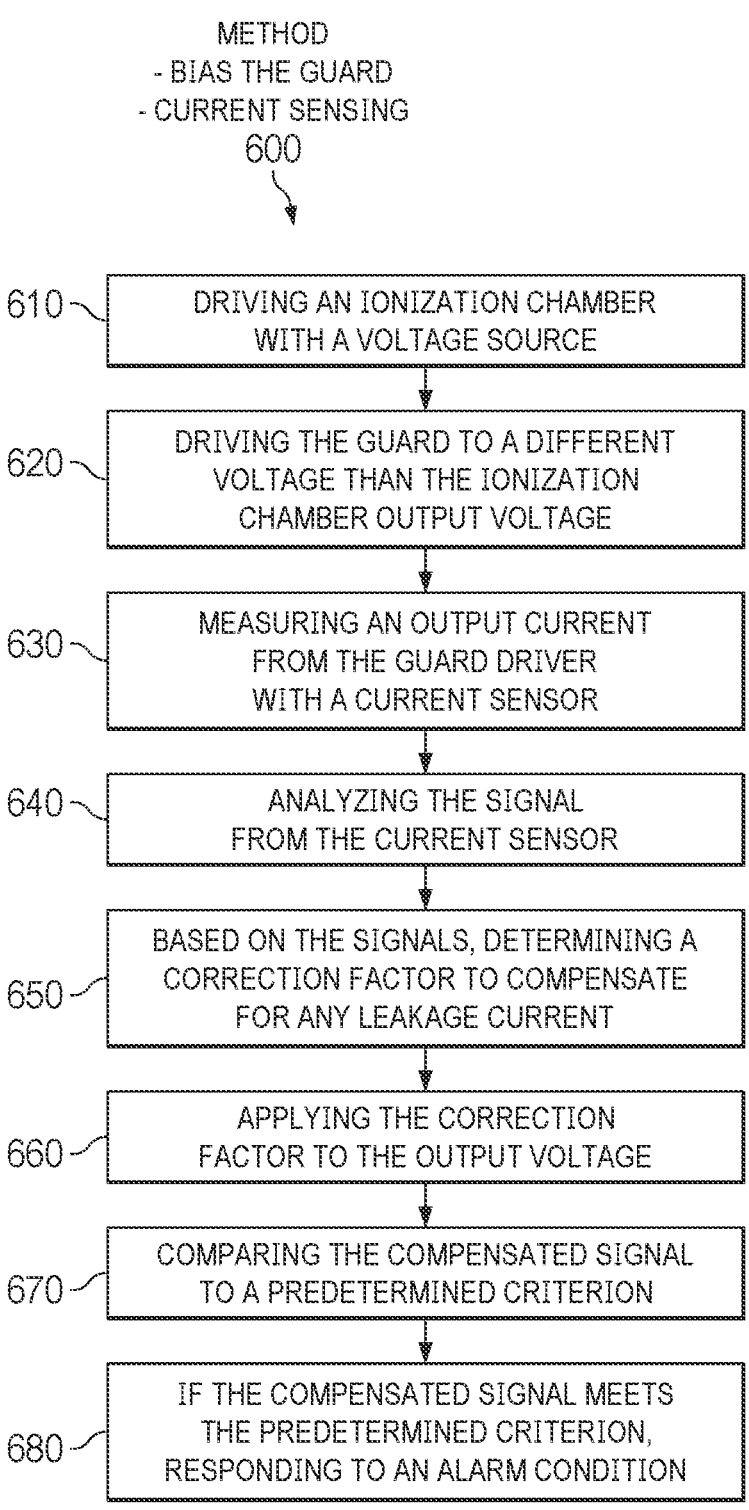

METHOD
- BIAS THE GUARD
- CURRENT SENSING
600

610 — DRIVING AN IONIZATION CHAMBER
WITH A VOLTAGE SOURCE

620 — DRIVING THE GUARD TO A DIFFERENT
VOLTAGE THAN THE IONIZATION
CHAMBER OUTPUT VOLTAGE

630 — MEASURING AN OUTPUT CURRENT
FROM THE GUARD DRIVER
WITH A CURRENT SENSOR

640 — ANALYZING THE SIGNAL
FROM THE CURRENT SENSOR

650 — BASED ON THE SIGNALS, DETERMINING A
CORRECTION FACTOR TO COMPENSATE
FOR ANY LEAKAGE CURRENT

660 — APPLYING THE CORRECTION
FACTOR TO THE OUTPUT VOLTAGE

670 — COMPARING THE COMPENSATED SIGNAL
TO A PREDETERMINED CRITERION

680 — IF THE COMPENSATED SIGNAL MEETS
THE PREDETERMINED CRITERION,
RESPONDING TO AN ALARM CONDITION

FIG. 5B

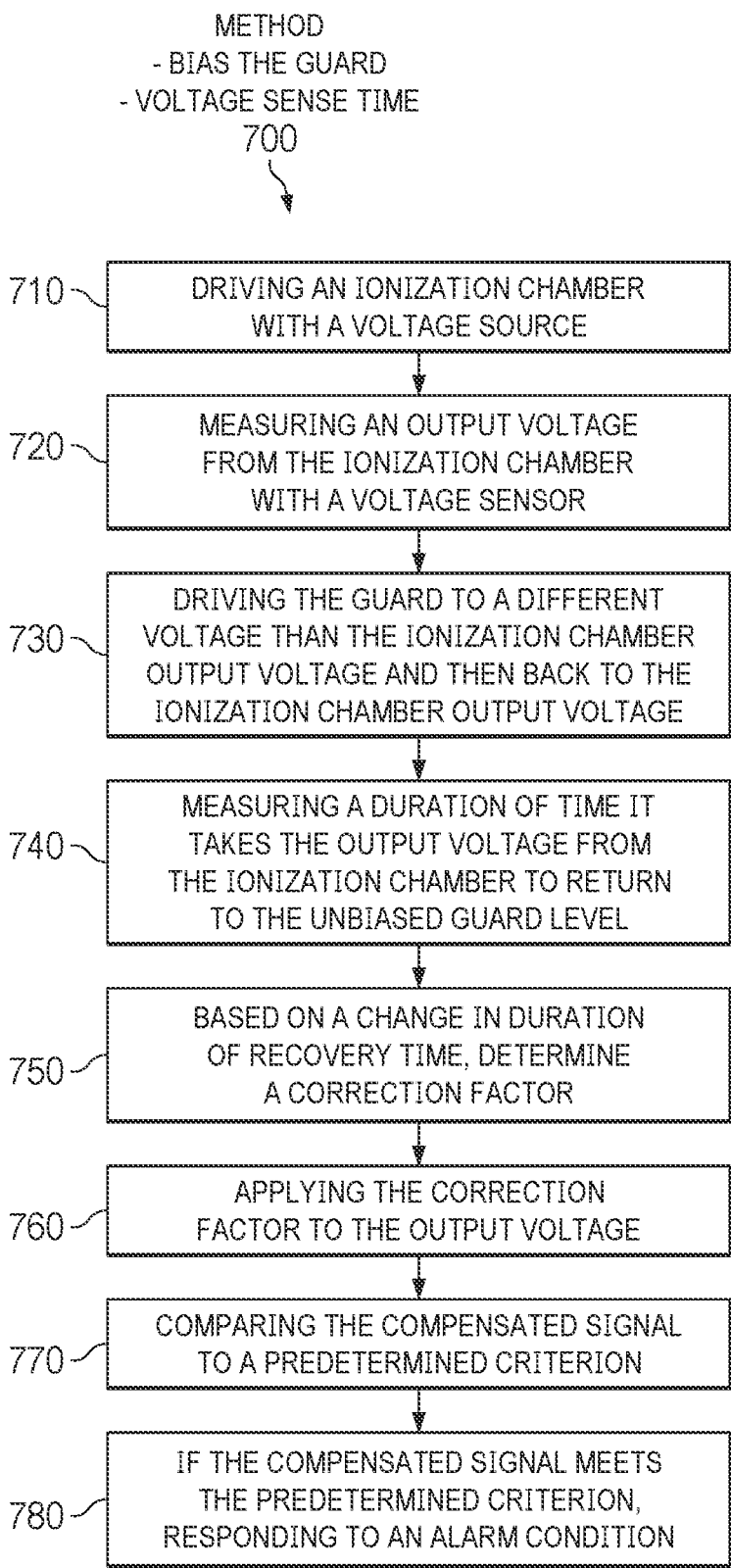

METHOD
- BIAS THE GUARD
- VOLTAGE SENSE TIME
700

710 — DRIVING AN IONIZATION CHAMBER
WITH A VOLTAGE SOURCE

720 — MEASURING AN OUTPUT VOLTAGE
FROM THE IONIZATION CHAMBER
WITH A VOLTAGE SENSOR

730 — DRIVING THE GUARD TO A DIFFERENT
VOLTAGE THAN THE IONIZATION CHAMBER
OUTPUT VOLTAGE AND THEN BACK TO THE
IONIZATION CHAMBER OUTPUT VOLTAGE

740 — MEASURING A DURATION OF TIME IT
TAKES THE OUTPUT VOLTAGE FROM
THE IONIZATION CHAMBER TO RETURN
TO THE UNBIASED GUARD LEVEL

750 — BASED ON A CHANGE IN DURATION
OF RECOVERY TIME, DETERMINE
A CORRECTION FACTOR

760 — APPLYING THE CORRECTION
FACTOR TO THE OUTPUT VOLTAGE

770 — COMPARING THE COMPENSATED SIGNAL
TO A PREDETERMINED CRITERION

780 — IF THE COMPENSATED SIGNAL MEETS
THE PREDETERMINED CRITERION,
RESPONDING TO AN ALARM CONDITION

FIG. 5C

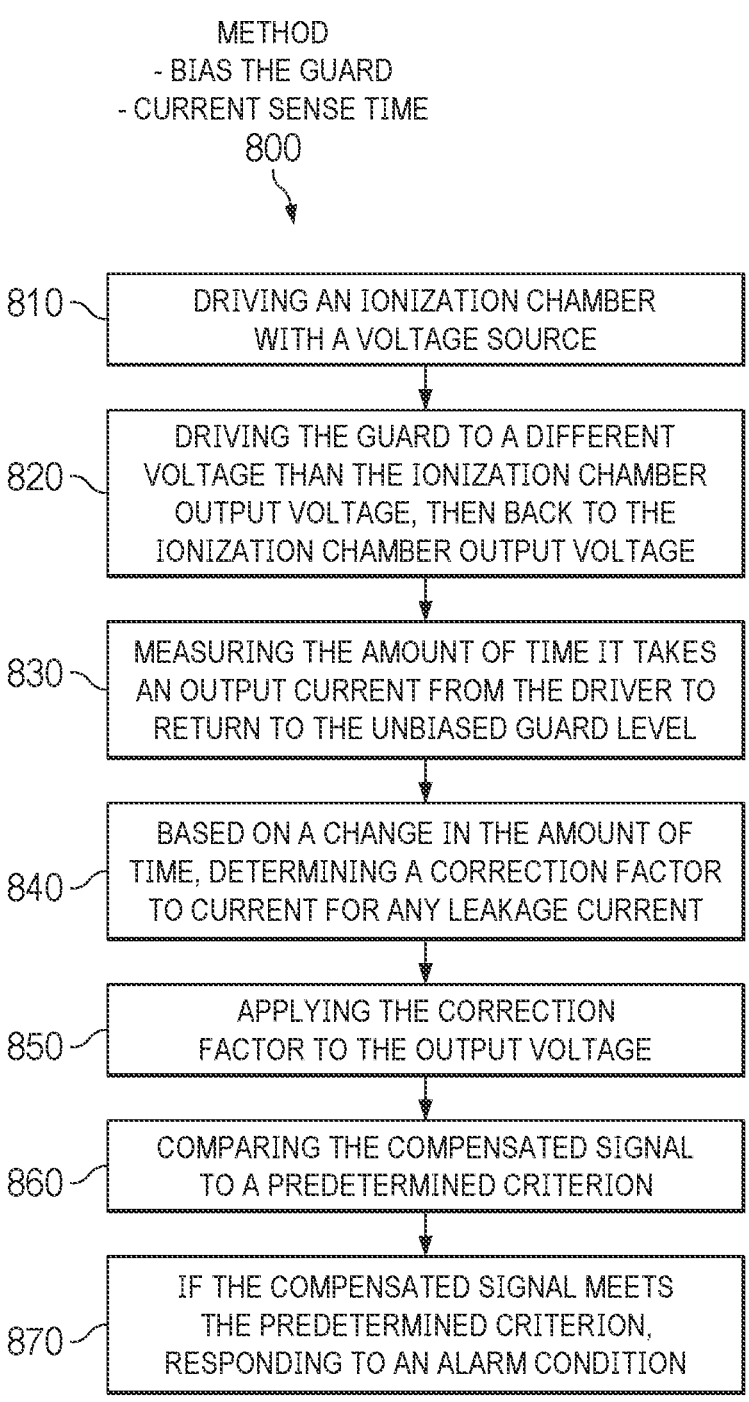

METHOD
- BIAS THE GUARD
- CURRENT SENSE TIME
800

810 — DRIVING AN IONIZATION CHAMBER
WITH A VOLTAGE SOURCE

820 — DRIVING THE GUARD TO A DIFFERENT
VOLTAGE THAN THE IONIZATION CHAMBER
OUTPUT VOLTAGE, THEN BACK TO THE
IONIZATION CHAMBER OUTPUT VOLTAGE

830 — MEASURING THE AMOUNT OF TIME IT TAKES
AN OUTPUT CURRENT FROM THE DRIVER TO
RETURN TO THE UNBIASED GUARD LEVEL

840 — BASED ON A CHANGE IN THE AMOUNT OF
TIME, DETERMINING A CORRECTION FACTOR
TO CURRENT FOR ANY LEAKAGE CURRENT

850 — APPLYING THE CORRECTION
FACTOR TO THE OUTPUT VOLTAGE

860 — COMPARING THE COMPENSATED SIGNAL
TO A PREDETERMINED CRITERION

870 — IF THE COMPENSATED SIGNAL MEETS
THE PREDETERMINED CRITERION,
RESPONDING TO AN ALARM CONDITION

FIG. 5D

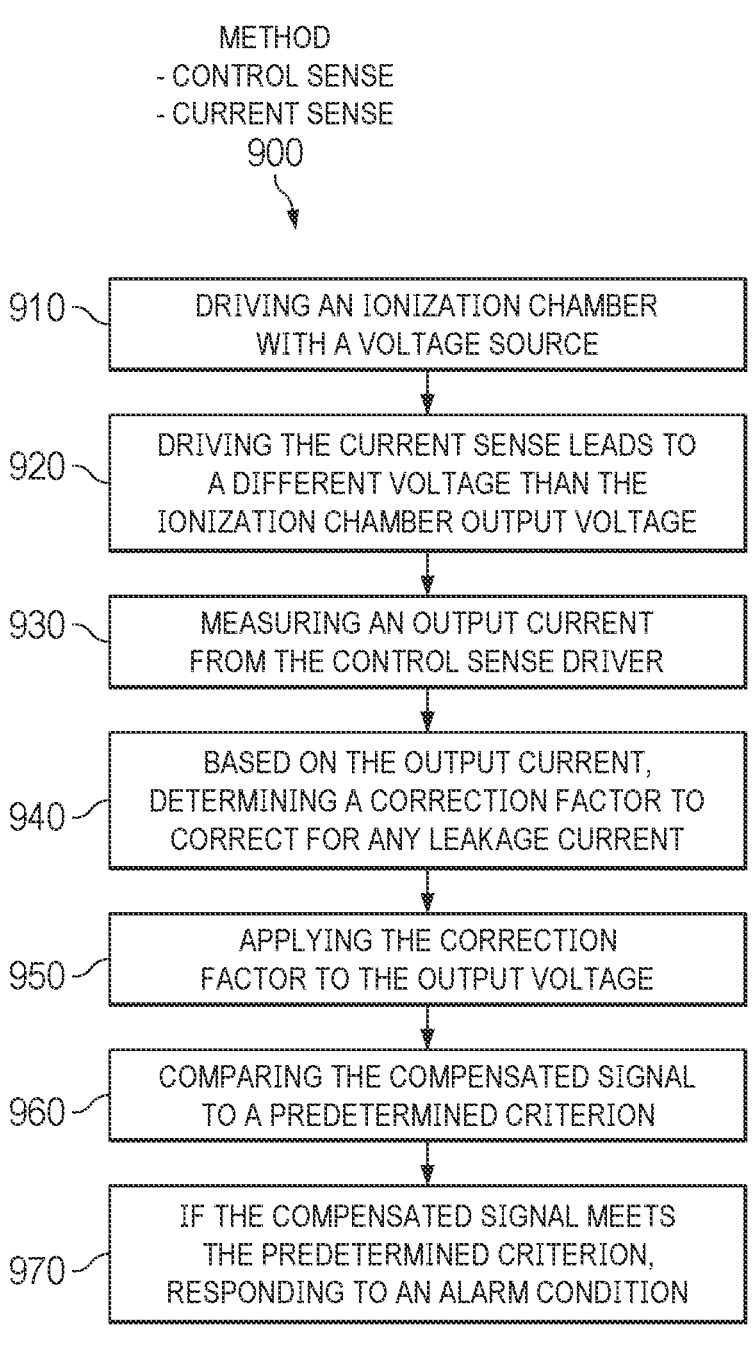

METHOD
- CONTROL SENSE
- CURRENT SENSE
900

910 — DRIVING AN IONIZATION CHAMBER
WITH A VOLTAGE SOURCE

920 — DRIVING THE CURRENT SENSE LEADS TO
A DIFFERENT VOLTAGE THAN THE
IONIZATION CHAMBER OUTPUT VOLTAGE

930 — MEASURING AN OUTPUT CURRENT
FROM THE CONTROL SENSE DRIVER

940 — BASED ON THE OUTPUT CURRENT,
DETERMINING A CORRECTION FACTOR TO
CORRECT FOR ANY LEAKAGE CURRENT

950 — APPLYING THE CORRECTION
FACTOR TO THE OUTPUT VOLTAGE

960 — COMPARING THE COMPENSATED SIGNAL
TO A PREDETERMINED CRITERION

970 — IF THE COMPENSATED SIGNAL MEETS
THE PREDETERMINED CRITERION,
RESPONDING TO AN ALARM CONDITION

FIG. 5E

LEAKAGE CURRENT NOISE REDUCTION FOR IONIZATION CHAMBER BASED ALARMS

CROSS-REFERENCE TO RELATED APPLICATIONS

This application claims priority to Provisional Patent Application 63/451,127 filed Mar. 9, 2023, the contents of which are hereby incorporated by reference in their entirety.

TECHNICAL FIELD

The present disclosure relates to sensors and/or alarms. Various uses for the teachings herein may include environmental monitoring such as smoke detectors and/or leakage current noise reduction for ionization chamber based alarms.

BACKGROUND

Ionization chambers may be used for the detection of smoke particles in smoke detectors. These are usually driven by a relatively high voltage to produce a sufficient output signal to distinguish from sources of noise. This output signal may be a voltage, typically buffered then assessed by a comparator. The source impedance of an ionization chamber can be in the tera-ohm range, which is significantly higher than the impedance of one of the most used printed circuit board (PCB) materials.

The large impedance mismatch and the relatively high voltages that are used to drive the ionization chamber can result in a leakage current across the PCB insulation. This leakage current introduces an imbalance in the ionization voltage driver and can cause the accumulation of residue from the PCB manufacturing process and dust overtime to form conductive dendrite growth which increases board conductivity. As the resistivity of the PCB becomes lower over time, the leakage current may increase, which may promote further dendrite development. Dendrite development may eventually lead to device failure if the intended ionization chamber voltage output is pulled too far from a baseline, or no leakage current, value by the additional current conduction path. This gradual device failure expresses itself during operation as the baseline signal slowly drifting closer to the alarm trip point level over time. As the baseline drift increases and the difference between the baseline and alarm trip point decreases over time, device sensitivity is reduced, the chances for a false alarm increase, and safety diminishes, putting lives and property at risk.

A first approach to resolve this issue is to provide a guard ring to reduce the leakage current. This includes using a buffer to track the input signal voltage and drive outer traces of the guard ring with a voltage that tracks the input signal voltage. This surrounds and "guards" the inner input signal voltage. By driving the nearby guard traces at the same voltage as the input signal voltage, the influence of the surrounding contamination is reduced which thereby decreases leakage current.

The buffer used for the guard ring circuit, however, is not an ideal op-amp. This amplifier will have a voltage offset, even if small, and will drift with time. This offset will introduce a voltage difference between the guard trace and the signal trace, causing leakage current and noise. The problem may be mitigated by using a precision amplifier or zero drift amplifier with lower offset, but these products can be several times more expensive than a standard op-amp.

A second approach to resolve this issue is to use a conformal coating on the PCB which reduces leakage current by preventing factory contamination and/or airborne contamination from reaching the input trace in the first place. This is done by means of creating a physical barrier and, therefore, providing a high impedance. Unfortunately, this approach requires extra manufacturing steps with a resulting higher cost. For this reason, conformal coatings are less commonly used.

A third approach to resolve this issue is to bend the lead of the amplifier input, so that it is in the air and directly contacting the ionization chamber rather than a trace on the PCB. A fourth and similar approach to resolve this issue is to drill a large hole corresponding to the location of the amplifier input lead, so as to achieve a similar effect blocking contact with the board, and using air as the insulator. The third and fourth approaches may require soldering a wire in air, and precludes the use of wave solder or solder reflow only, adding additional manufacturing steps, additional cost, and introducing potential quality issues.

SUMMARY

As an example of the teachings herein, an apparatus may comprise: an ionization chamber; a voltage source to drive the ionization chamber; a voltage sensor to measure an ionization chamber output voltage; a calibration circuit to compensate the ionization chamber output voltage based on a correction factor; and a monitoring circuit to trigger an alarm if the compensated output voltage meets a predetermined condition; wherein the calibration circuit is operable to determine the correction factor to compensate for any leakage current affecting the ionization chamber output voltage.

As another example, a smoke detector may include: an ionization chamber; an inlet to provide a sample to the ionization chamber; a voltage source to drive the ionization chamber; a voltage sensor to measure an ionization chamber output voltage; a calibration circuit to compensate the ionization chamber output voltage based on a correction factor; and a monitoring circuit to trigger an alarm if the compensated output voltage meets a predetermined condition; wherein the calibration circuit is operable to determine the correction factor to compensate for any leakage current affecting the ionization chamber output voltage.

As another example, a method may comprise: driving an ionization chamber with a voltage source; measuring an ionization chamber output voltage with a voltage sensor; driving a lead to a second voltage different from the ionization chamber output voltage; measuring a reaction to the second voltage; analyzing the reaction and based on the reaction, determining a correction factor to compensate for any leakage current affecting the ionization chamber output voltage; applying the correction factor to the signal with a calibration circuit; comparing the compensated signal to a predetermined criterion, wherein the predetermined criterion includes an alarm condition; and responding to the alarm condition if the compensated signal meets the predetermined criterion.

BRIEF DESCRIPTION OF THE DRAWINGS

The teachings of the present disclosure are further elucidated based on the drawings which depict examples thereof. In the drawings:

FIGS. 5A-5F are flowcharts depicting example methods incorporating teachings of the present disclosure.

DETAILED DESCRIPTION

Typically, during initial calibration of an ionization chamber smoke detector at the factory, a baseline "clean air/clean device" signal is recorded in device memory. The recorded signal reflects the initial current output of the ionization chamber prior to deployment. During device operation, the ionization chamber smoke detector periodically wakes up to sample the output voltage of the ionization chamber. While sampling, the ionization chamber smoke detector engages a calibration circuit to compensate for the baseline signal as it drifts slowly over time due to contamination and dust build-up. The compensation includes measuring the difference between the initial factory set "clean air/clean device" signal and a current baseline signal. This difference may be saved as a "compensation factor" and subtracted from measurements or used to adjust detection limits, thus preserving device sensitivity for smoke detection.

Systems and/or methods to preserve device sensitivity despite the build-up of dust and contamination may reduce the risk of false alarms and maintain correct operation of the ionization chamber smoke detector for its entire planned lifetime, enhancing safety and protecting lives and property. The firmware-based or state machine-based solutions described herein may be monitored and tuned over time. The systems and/or methods described herein account for current leakage due to contamination and do not require any additional manufacturing steps. This permits the selection and use of a low cost, standard performance op-amp. This may also eliminate the need for a conformal coating or larger through-holes or special soldering intended to control board current leakage by increasing impedance and/or physically separating the components. This may also enable ionization chamber smoke detectors to report these changes in baseline drift over interconnect, Wi-Fi, or other means of communication to alert when the device needs to be cleaned or replaced.

Figures 1, 2A:
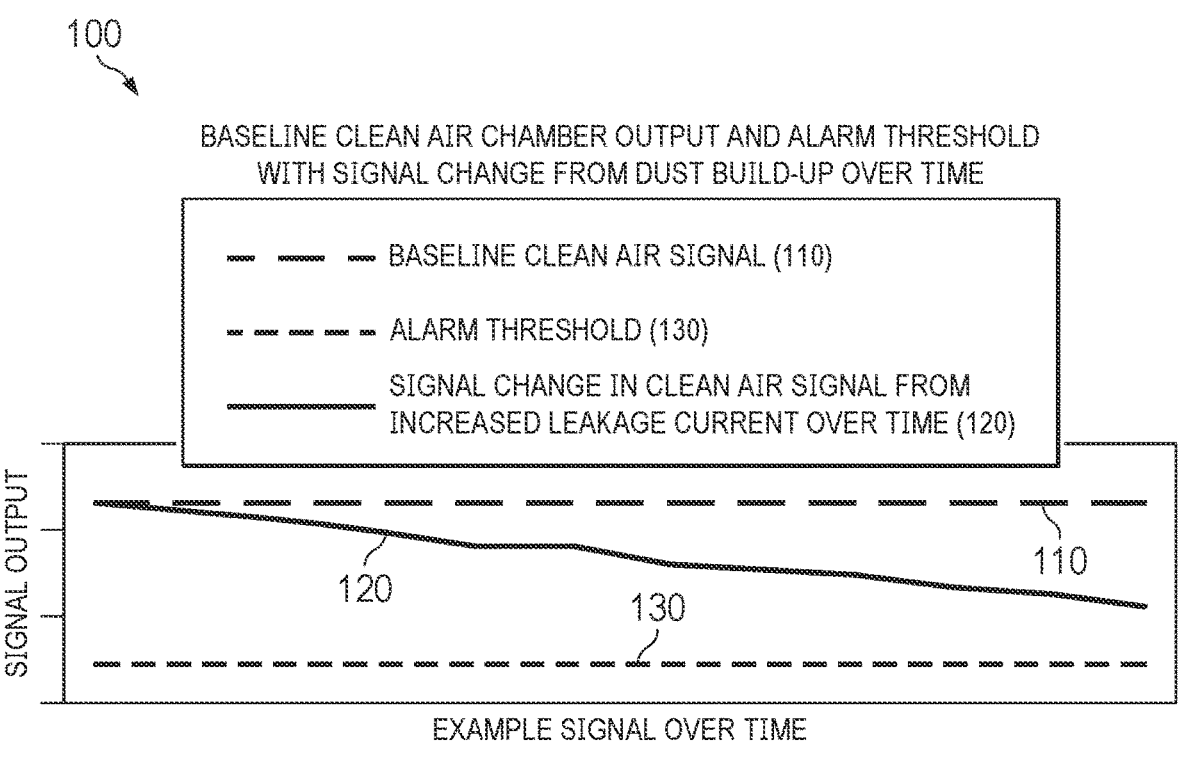
FIG. 1 is a graph depicting a signal change in the output of a smoke detector caused by leakage current increasing over time.
FIGS. 2A and 2B are drawings showing an example apparatus incorporating teachings of the present disclosure.

FIG. 1 is a graph 100 depicting a trace 120 of an output voltage of an ionization chamber smoke detector changing over time caused by increasing leakage current. Graph 100 shows traces corresponding to an example voltage signal output from an ionization chamber smoke detector after deployment. Trace 110 indicates the value of an ionization chamber output voltage of a clean air signal which is measured at the factory in a "clean" state before the ionization chamber smoke detector is deployed. As shown, trace 110 remains constant over time. Trace 120 shows actual signal for clean air for an ionization chamber output voltage decreasing over time due to leakage current creating an imbalance in the chamber voltage divider.

As shown, the leakage current can build over time, which drives the trace 120 away from the clean state and closer to trace 130. Trace 130 represents the smoke detection threshold or alarm value. That is, if the measured voltage equals or is lower than the limit shown on trace 130, the ionization chamber smoke detector senses smoke or a fire. As trace 120 approaches trace 130, the chances of a false positive signal increase. Further, the device loses sensitivity range to a true smoke or fire condition because the leakage current distorts the chamber response to the presence of smoke.

The build-up of residue and dust causes dendrite growth inside the ionization chamber, which lowers the resistivity of the PCB. Dendrite growth increases leakage current, which promotes further dendrite growth. This eventually causes device failure when the ionization chamber output voltage is too greatly affected by the leakage. Gradual device failure expresses itself as the baseline signal slowly drifting closer to the smoke detection threshold over time. As baseline drift increases, the difference between the baseline and smoke detection threshold decreases over time. Device sensitivity is reduced, and the chances for a false report increase, putting lives and property at risk.

FIG. 2A is a schematic drawing showing an example apparatus incorporating teachings of the present disclosure. As shown, an ionization chamber is driven by a voltage source. A voltage sensor measures the ionization chamber output voltage. That voltage may be provided to a monitoring circuit (shown with a dotted line) to determine whether an alarm condition exists. As shown, however, the ionization chamber output voltage is first provided to a calibration circuit which is operable to apply a correction factor and compensate for any leakage current. Further, the calibration circuit is operable to determine the correction factor, as described herein.

Figure 2B:
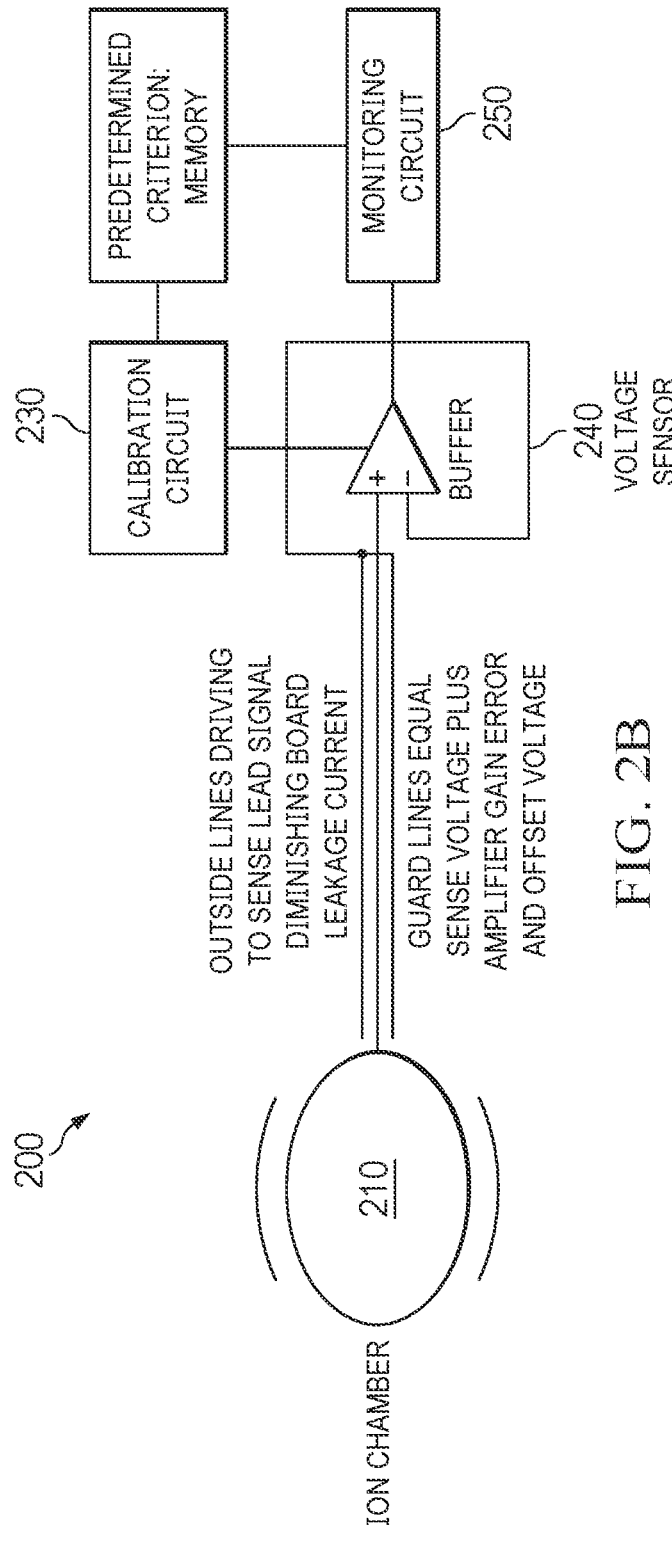

FIG. 2B is an illustration of example apparatus 200, incorporating teachings of the present disclosure. The apparatus 200 may include an ionization chamber 210, a calibration circuit 230, a voltage sensor 240, and an alarm circuit 250. Some of these components may be provided by a microcontroller (MCU) which may make introduce little or no additional end product cost. A microcontroller is an intelligent semiconductor integrated circuit (IC) that comprises a processor unit, memory modules, communication interfaces, and, in some cases, peripherals. Typically, an MCU functions by executing program instructions stored in the memory modules using the processor unit. The instructions typically cause the MCU to drive the communication interfaces (e.g., sense inputs and drive outputs).

The ionization chamber 210 may include a chamber open to ambient air in the room or space to be monitored. The natural flow of air through the chamber allows detection of smoke particles therein. The ionization chamber 210 may include any circuitry appropriate to measure a change resulting from the number of ion pairs in the sampled air. For example, some examples include a set of parallel plates making up an anode and a cathode or a cylinder (forming the cathode) with a coaxial anode wire inside the cylinder. When a voltage potential is applied across two electrodes, any gas atoms or molecules in the sample may be ionized and migrate toward an electrode, driving the sensors to show a signal. In some smoke detectors, for example, the ionization chamber contains a small amount of an alpha particle emitter (e.g., americium-241).

Those alpha particles ionize air and airborne particles which are carried by the applied E-field driving a steady baseline current in both the open-air chamber and the closed chamber resulting in a voltage drop across each chamber and a voltage divided by the two chambers at the output. When smoke particles enter the open air chamber, they too become ionized, but are heavier than air particles and so move slower in the E-field resulting in decreased charge transfer and hence lower current flow. This effectively makes the open-air chamber more resistive, increasing the voltage drop across the open-air chamber and decreasing the voltage drop across the closed-air chamber. The ionization chamber 210 provides a series current through both chambers. The lower chamber resistance has not changed, but the current flow has decreased due to the open-air chamber lower current flow. Therefore, the lower chamber shows a voltage drop because of lower current across the same resistance. The output voltage then decreases as smoke particles enter the open air chamber and are carried away by the E-field.

The calibration circuit 230 may include any circuitry used to compensate an output voltage signal from the ionization chamber 210 based on a factory baseline or other calibration.

The voltage sensor 240 may include any circuitry used to transform the ionization chamber 210 output voltage corresponding to the current generated in the ionization chamber 210.

The monitoring circuit 250 may include any circuitry used to assess the voltage signal from the voltage sensor 240, including assessing for a smoke or fire condition. The monitoring circuit 250 may trigger an alarm in response to an alarm condition including, but not limited to, an audible alert, flashing lights, a signal to a monitoring service, etc.

The apparatus 200 incorporating teachings of the present disclosure may allow adjustments for effects of contamination, warnings if detector becomes too contaminated, warnings for detectors in production that show signs of having field issues, may allow use of MCUs instead of more complex and/or expensive components, and use of surface mount technology instead of thru-hole solutions.

Figure 3A:
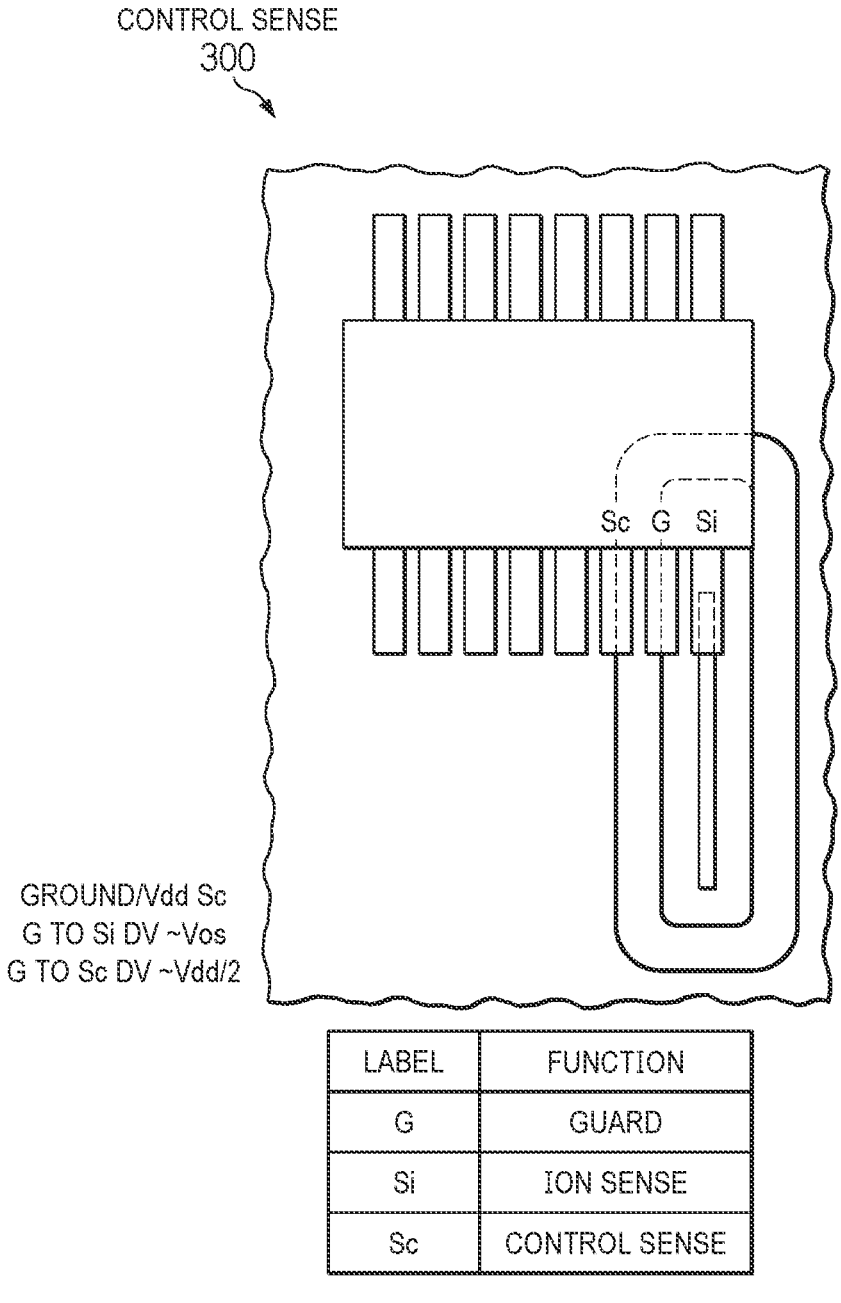
FIGS. 3A and 3B are drawings showing an example apparatus for control sense measurement incorporating teachings of the present disclosure.
Figure 3B:
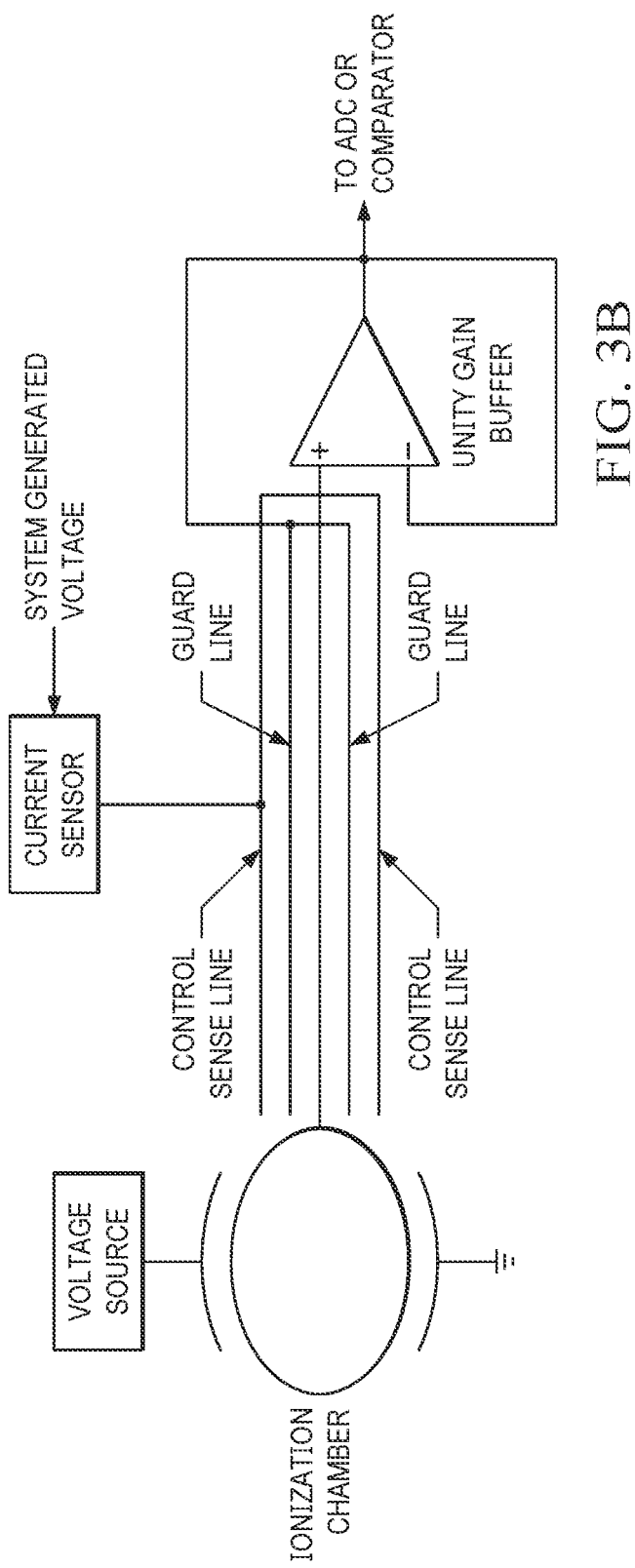

FIGS. 3A and 3B are drawings showing an example apparatus 300 for control sense measurement incorporating teachings of the present disclosure. As shown in FIG. 3A, the control sense apparatus 300 may include an MCU with a Guard lead G, an Ion Sense lead Si, and a Control Sense lead Sc. The Ion Sense lead Si serves to measure the ionization chamber output voltage. The Control Sense lead Sc and associated trace surrounds the Guard lead G and associated trace. The Control Sense lead Sc and associated trace is normally biased to ground or Vdd or another predetermined voltage delta from the Guard lead G. The bias current flowing between Guard lead G and Control Sense lead Sc is measured and recorded and used as a control measurement of leakage current increase to determine an appropriate offset for the Ion Sense lead Si and the Guard lead G. Alternatively, the Control Sense lead Sc may be biased to Guard voltage level and periodically changed to another voltage to measure leakage current to determine an appropriate offset to compensate for board leakage from the Ion Sense lead Si to the Guard lead G. FIG. 3B shows a schematic version of the compensation scheme.

In operation, the voltage at the Control Sense lead Sc is periodically biased to a large delta from the voltage at the Guard lead G. The leakage current is measured. The measured leakage current is used to determine the condition of the board resistivity in the region between the Guard lead G and the Control Sense lead Sc. This resistivity is an indirect measurement of the board resistivity that allows measurement without disturbing the output voltage of the ionization chamber 210. Using this regional resistivity, the calibration circuit 230 calculates any required offset of the ionization chamber output voltage resulting from the leakage current. In an example, the Control Sense lead Sc is biased from the Guard Lead G to a new voltage based on the difference between the Guard lead G and the Ion Sense lead Si.

Figure 4A:
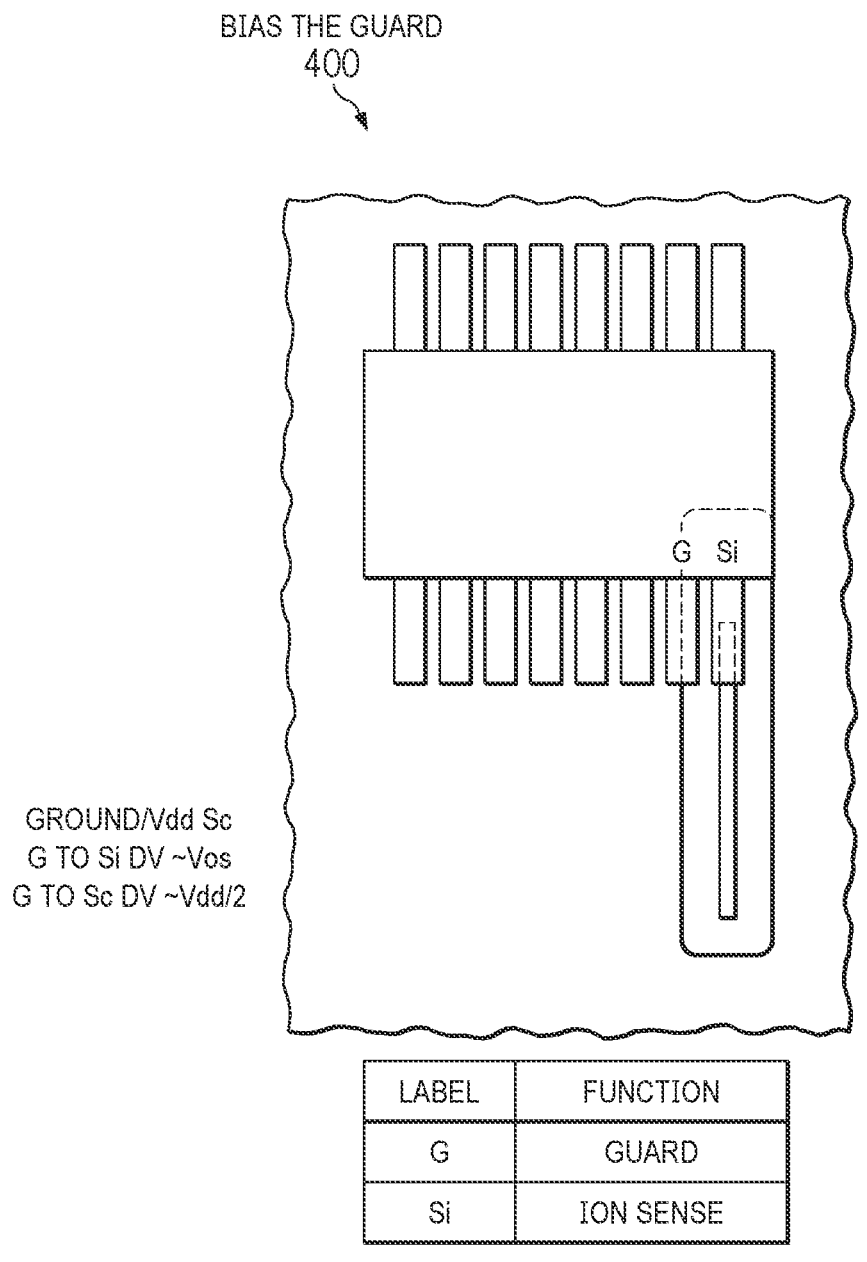
FIGS. 4A-4C are drawings showing an example apparatus for guard pin bias incorporating teachings of the present disclosure.
Figure 4B:
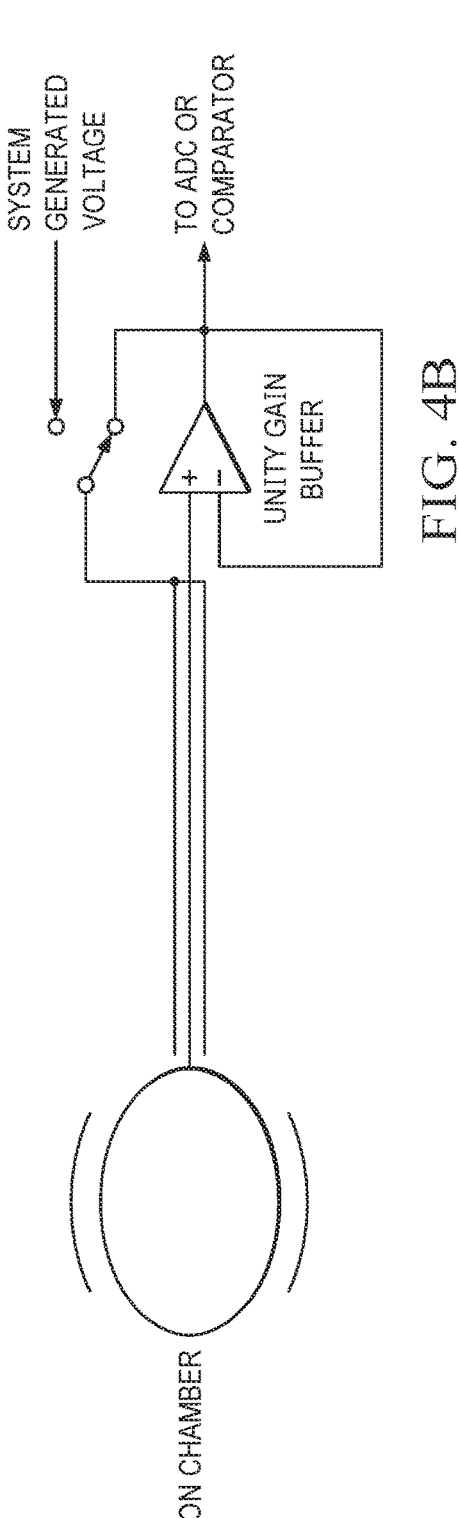
Figure 4C:
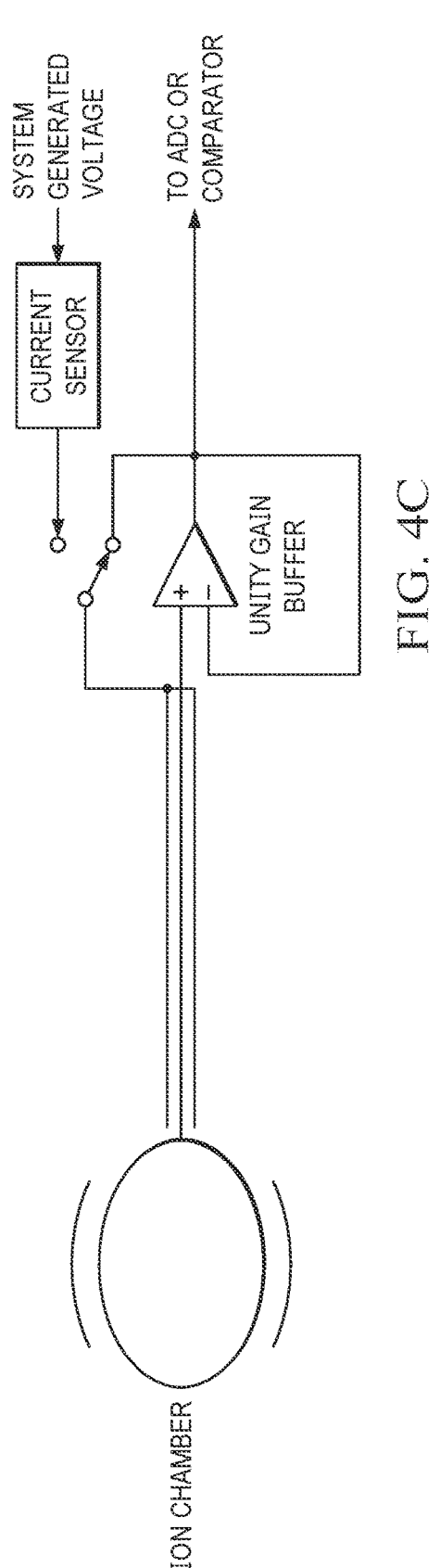

FIGS. 4A-4C are drawings showing an example apparatus 400 for Guard pin bias incorporating teachings of the present disclosure. The apparatus 400 may include an MCU, a State Machine, or discrete components with a Guard lead G and an Ion Sense lead Si. Guard pin bias may be performed by internally disconnecting the guard ring from the buffer output and connecting the Guard lead G to ground or to Vdd or to a voltage other than the ionization chamber output voltage connected to the Ion Sense lead Si and measure the time to settle, change in magnitude, or rate of change in voltage of the buffer disconnected from the Guard lead G. A small offset between the guard and buffered output, such as 100 millivolts, may be used to improve ionization chamber recovery time. A gradual change may be used to avoid step function current flow unsettling the ionization chamber. Time for the ionization chamber to settle, change in magnitude, or rate of change in the buffer output voltage may be considered as an indication of leakage current as settle time should be zero with no leakage current and increases directly with an increase in leakage between Guard lead G and Ion Sense lead Si. FIGS. 4B and 4C show a schematic for the compensation scheme.

In operation, the Guard lead G is biased to the output voltage of the ionization chamber 210 to reduce any leakage current to the Ion Sense lead Si. Periodically, the voltage applied to the Guard is switched to create a larger difference between the Guard lead G and the Ion Sense lead Si, increasing the leakage current. This increased current creates an imbalance in the ionization voltage divider, which in turn changes the output voltage. The change in the output voltage is used to determine an offset needed to compensate for the leakage current in normal operation. In some examples, the leakage current from the system generated voltage may be used to determine the offset needed.

Examples of the present disclosure may lower cost and allow the use of surface mount devices. Currently, thru-hole components are predominantly used, and construction of smoke detectors may be made by drilling a hole through the PCB to connect ionization chambers without PCB contact. Some examples may include digital calibration and tracking of the Ion Sense lead Si to allow use of surface mount components. Some examples may include digital tracking of sense lead leakage to determine dendrite growth. Some examples may include production base line to test for cleanliness.

FIG. 5A is a flowchart depicting an example method 500 incorporating teachings of the present disclosure. Method 500 includes biasing the Guard lead and sensing a voltage generated in response.

Step 510 may include driving an ionization chamber with a voltage source.

Step 520 may include measuring an output voltage from the ionization chamber with a voltage sensor.

Step 530 may include driving a Guard lead to a different voltage than the ionization chamber output voltage.

Step 540 may include measuring a second output voltage from the ionization chamber.

Step 550 may include analyzing the change from the ionization chamber voltage output to the second output voltage.

Step 560 may include determining the correction factor to compensate for any leakage current.

Step 570 may include applying the correction factor to the ionization chamber output voltage.

Step 580 may include comparing the compensated signal to a predetermined criterion.

Step 590 may include responding to an alarm condition if the compensated signal meets the predetermined criterion.

FIG. 5B is a flowchart depicting an example method 600 incorporating teachings of the present disclosure. Method 600 includes biasing the Guard lead and measuring a current resulting in response.

Step 610 may include driving an ionization chamber with a voltage source.

Step 620 may include driving a Guard lead to a different voltage than the ionization chamber output voltage.

Step 630 may include measuring an output current from the Guard driver.

Step 640 may include analyzing the output current.

Step 650 may include determining the correction factor based on the output current.

Step 660 may include applying the correction factor to the ionization chamber output voltage.

Step 670 may include comparing the compensated signal to a predetermined criterion.

Step 680 may include responding to an alarm condition if the compensated signal meets the predetermined criterion.

FIG. 5C is a flowchart depicting an example method 700 incorporating teachings of the present disclosure. Method 700 includes biasing the Guard lead and sensing a responsive voltage change over time.

Step 710 may include driving an ionization chamber with a voltage source.

Step 720 may include measuring the ionization chamber output voltage.

Step 730 may include driving a Guard lead to a different voltage than the ionization chamber output voltage and then back to the ionization chamber output voltage.

Step 740 may include measuring a duration of time it takes for the ionization chamber output voltage to return to the unbiased Guard level.

Step 750 may include determining the correction factor based on the measured duration.

Step 760 may include applying the correction factor to the ionization chamber output voltage.

Step 770 may include comparing the compensated signal to a predetermined criterion.

Step 780 may include responding to an alarm condition if the compensated signal meets the predetermined criterion.

FIG. 5D is a flowchart depicting an example method 800 incorporating teachings of the present disclosure. Method 800 includes biasing the Guard lead and sensing a responsive change in the current.

Step 810 may include driving an ionization chamber with a voltage source.

Step 820 may include driving the Guard lead to a different voltage than the ionization chamber output voltage, then back to the ionization chamber output voltage.

Step 830 may include measuring an amount of time it takes an output current from the Guard driver to return to the unbiased Guard level.

Step 840 may include determining the correction factor based on a change in the amount of time.

Step 850 may include applying the correction factor to the ionization chamber output voltage.

Step 860 may include comparing the compensated signal to a predetermined criterion.

Step 870 may include responding to an alarm condition if the compensated signal meets the predetermined criterion.

FIG. 5E is a flowchart depicting an example method 900 incorporating teachings of the present disclosure. Method 900 includes driving the Control Sense leads and measuring a responsive current.

Step 910 may include driving an ionization chamber with a voltage source.

Step 920 may include driving the Current Sense leads to a different voltage than the ionization chamber output voltage.

Step 930 may include measuring an output current from the Control Sense driver.

Step 940 may include determining the correction factor based on the output current.

Step 950 may include applying the correction factor to the ionization chamber output voltage.

Step 960 may include comparing the compensated signal to a predetermined criterion.

Step 970 may include responding to an alarm condition if the compensated signal meets the predetermined criterion.

Figure 5F:
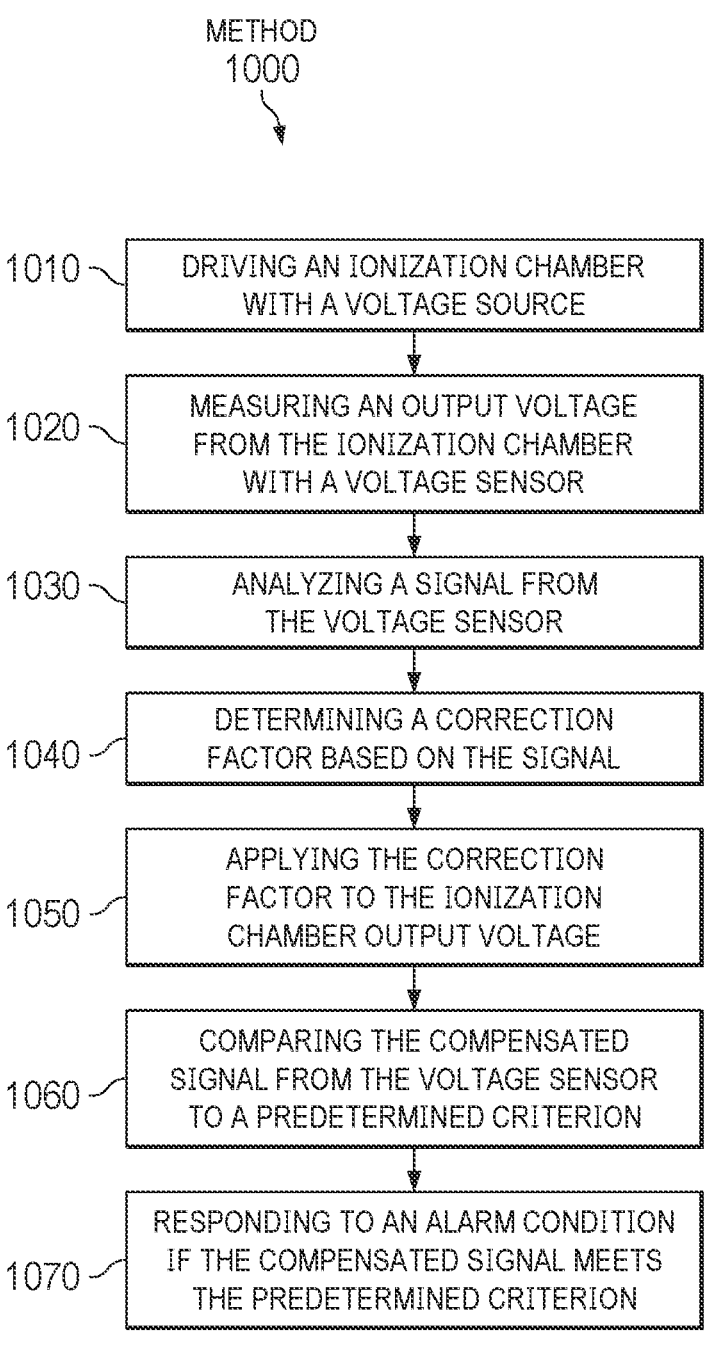

FIG. 5F is a flowchart depicting an example method 100 incorporating teachings of the present disclosure. Method 1000 includes driving the Control Sense leads and measuring a responsive current.

Step 1010 may include driving an ionization chamber with a voltage source.

Step 1020 may include measuring the ionization chamber output voltage with a voltage sensor.

Step 1030 may include analyzing the signal generated by the voltage sensor.

Step 1040 may include determining a correction factor based on the signal.

Step 1050 may include applying the correction factor to the ionization chamber output voltage.

Step 1060 may include comparing the compensated signal to a predetermined criterion.

Step 1070 may include responding to an alarm condition if the compensated signal meets the predetermined criterion.

Although example embodiments have been described above, other variations and embodiments may be made from this disclosure without departing from the spirit and scope of these embodiments.

The invention claimed is:

1. An apparatus comprising:
an ionization chamber;
a voltage source to drive the ionization chamber;
a voltage sensor to measure an ionization chamber output voltage;
a control sense driver to drive a floating control sense line electrically isolated from the ionization chamber;
a current sensor to measure output current through the control sense driver;
a calibration circuit to compensate the ionization chamber output voltage based on a correction factor; and
a monitoring circuit to trigger an alarm if the compensated output voltage meets a predetermined condition;
wherein the calibration circuit is operable to determine the correction factor to compensate for any leakage current affecting the ionization chamber output voltage, wherein the correction factor is based at least in part on the measured output current through the control sense driver.

2. An apparatus according to claim 1, comprising a memory storing a factory baseline signal corresponding to a factory original condition of the ionization chamber prior to deployment.

3. An apparatus according to claim 1, wherein the calibration circuit is operable to:
drive a guard lead to a second voltage different from the ionization chamber output voltage;
measure a second output voltage from the ionization chamber in response; and determine the correction factor based at least in part on a difference between the ionization chamber output voltage and the second output voltage.

4. An apparatus according to claim 1, wherein the calibration circuit is operable to:

drive a guard lead to a second voltage different from the ionization chamber output voltage;

measure an output current from the guard driver; and determine the correction factor based at least in part on the output current.

5. An apparatus according to claim 1, wherein the calibration circuit is operable to:

drive a guard lead to a second voltage different from the ionization chamber output voltage, then return the guard lead to the ionization chamber output voltage;

measure a duration of time required for the ionization chamber output voltage to return to an unbiased guard level; and determine the correction factor based at least in part on a change in the duration of time compared to a factory baseline.

6. An apparatus according to claim 1, wherein the calibration circuit is operable to:

drive a guard lead to a second voltage different from the ionization chamber output voltage, then returns the guard lead to the ionization chamber output voltage;

measure a duration of time required for a current from the voltage driver to return to an unbiased guard level; and determine the correction factor based at least in part on a change in the duration of time compared to a factory baseline.

7. An apparatus according to claim 1, wherein the calibration circuit is operable to:

determine a current leakage; and activate an alert if the current leakage meets a predetermined threshold.

8. A smoke detector comprising:

an ionization chamber;

an inlet to provide a sample to the ionization chamber;

a voltage source to drive the ionization chamber;

a voltage sensor to measure an ionization chamber output voltage;

a control sense driver to drive a floating control sense line electrically insulated from the ionization chamber;

a current sensor to measure output current through the control sense driver;

a calibration circuit to compensate the ionization chamber output voltage based on a correction factor; and a monitoring circuit to trigger an alarm if the compensated output voltage meets a predetermined condition;

wherein the calibration circuit is operable to determine the correction factor to compensate for any leakage current affecting the ionization chamber output voltage, wherein the correction factor is based at least in part on the measured output current through the control sense driver.

9. A smoke detector according to claim 8, comprising a memory storing a factory baseline signal corresponding to a factory original condition of the ionization chamber prior to deployment.

10. A smoke detector according to claim 8, wherein the calibration circuit is operable to:

drive a guard lead to a second voltage different from the ionization chamber output voltage;

measure a second output voltage from the ionization chamber; and determine the correction factor based at least in part on a difference between the ionization chamber output voltage and the second output voltage.

11. A smoke detector according to claim 8, wherein the calibration circuit is operable to:

drive a guard lead to a second voltage different from the ionization chamber output voltage;

measure an output current from the guard driver; and determine the correction factor based at least in part on the output current.

12. A smoke detector according to claim 8, wherein the calibration circuit is operable to:

drive a guard lead to a second voltage different from the ionization chamber output voltage, then return the guard lead to the ionization chamber output voltage;

measure a duration of time required for the ionization chamber output voltage to return to an unbiased guard level; and determine the correction factor based at least in part on a change in the duration of time compared to a factory baseline.

13. A smoke detector according to claim 8, wherein the calibration circuit is operable to:

drive a guard lead to a second voltage different from the ionization chamber output voltage, then return the guard lead to the ionization chamber output voltage;

measure a duration of time required for a current from the voltage driver to return to an unbiased guard level; and determine the correction factor based at least in part on a change in the duration of time compared to a factory baseline.

14. A smoke detector according to claim 8, wherein the calibration circuit is operable to:

determine a current leakage; and activate an alert if the current leakage meets a predetermined threshold.

15. A smoke detector according to claim 8, comprising a memory storing a factory baseline signal corresponding to a factory original condition of the ionization chamber prior to deployment;

wherein the predetermined criterion is based at least in part on the factory baseline signal.

16. A method comprising:

driving an ionization chamber with a voltage source;

measuring an ionization chamber output voltage with a voltage sensor;

driving a lead to a second voltage different from the ionization chamber output voltage, the lead electrically insulated from the ionization chamber;

measuring a reaction to the second voltage;

analyzing the reaction and based on the reaction, determining a correction factor to compensate for any leakage current affecting the ionization chamber output voltage, wherein the leakage current includes current across a printed circuit board (PCB) from the voltage source to the voltage sensor;

applying the correction factor to the signal with a calibration circuit;

comparing the compensated signal to a predetermined criterion, wherein the predetermined criterion includes an alarm condition; and responding to the alarm condition if the compensated signal meets the predetermined criterion.

17. A method according to claim 16, wherein:

the lead comprises a guard lead;

the reaction includes a second output voltage from the ionization chamber; and analyzing the reaction includes determining a difference between the output voltage and the second output voltage; and the compensation factor depends at least in part on the determined difference.

18. A method according to claim 16, wherein:

the lead comprises a guard lead;

the reaction includes an output current from the guard sensor;

analyzing the reaction includes determining a value for the output current; and the compensation factor depends at least in part on the value of the output current.

19. A method according to claim 16, wherein:

the lead comprises a guard lead;

the method further comprises, after driving the guard lead to the drive voltage, driving the guard lead back to the ionization chamber output voltage;

analyzing the reaction includes determining a duration of time required for the ionization chamber output voltage to return to an unbiased guard level; and the compensation factor depends at least in part on a change in the determined duration against a baseline duration.

20. A method according to claim 16, wherein:

the lead comprises a guard lead;

the method further comprises, after driving the guard lead to the drive voltage, driving the guard lead back to the ionization chamber output voltage;

analyzing the reaction includes determining a duration of time required for an output current from the voltage source to return to an unbiased guard level; and the compensation factor depends at least in part on a change in the determined duration against a baseline duration.

21. A method according to claim 16, wherein:

the lead comprises current sense leads;

analyzing the reaction includes determining an output current from a control sense driver; and the compensation factor depends at least in part on the output current.

22. A method according to claim 16, wherein determining the compensation factor includes measuring a new baseline signal corresponding to an active leakage current.

23. A method according to claim 16, comprising:

measuring a signal corresponding to an active leakage current; and activating an alert if the signal meets a predetermined threshold.

24. An apparatus according to claim 1, wherein the control sense driver alternately drives the control sense line at a normal voltage and at a measurement voltage different from the normal voltage.

25. An apparatus according to claim 8, wherein the control sense driver alternately drives the control sense line at a normal voltage and at a measurement voltage different from the normal voltage.

* * * * *